United States Patent
Ng et al.

(10) Patent No.: US 7,253,981 B2
(45) Date of Patent: Aug. 7, 2007

(54) DISC DRIVE WITH REDUCED WRITE LATENCY

(75) Inventors: Wei Loon Ng, Singapore (SG); Bo Tian, Irvine, CA (US); Yong Liu, Singapore (SG)

(73) Assignee: Seagate Technology, LLC, Scotts Valley, CA (US)

( * ) Notice: Subject to any disclaimer, the term of this patent is extended or adjusted under 35 U.S.C. 154(b) by 180 days.

(21) Appl. No.: 10/252,742

(22) Filed: Sep. 23, 2002

(65) Prior Publication Data

US 2003/0202270 A1 Oct. 30, 2003

Related U.S. Application Data

(60) Provisional application No. 60/375,858, filed on Apr. 26, 2002.

(51) Int. Cl.
G11B 5/09 (2006.01)
G06F 12/00 (2006.01)
G06F 13/00 (2006.01)
G06F 13/28 (2006.01)
G11B 5/596 (2006.01)

(52) U.S. Cl. .................. 360/48; 360/51; 360/78.04; 711/112

(58) Field of Classification Search .................. 360/51, 360/75
See application file for complete search history.

(56) References Cited

U.S. PATENT DOCUMENTS 5,570,332 A 10/1996 Heath et al. ............... 369/50
5,715,105 A * 2/1998 Katayama et al. ............ 360/48
6,191,912 B1 * 2/2001 Gaertner et al. ......... 360/78.04
6,282,041 B1 8/2001 Blumenau ................. 360/48
6,339,811 B1 1/2002 Gaertner et al. ............ 711/112
6,366,980 B1 4/2002 Haines et al. ............... 711/112
6,369,968 B1 4/2002 Haines et al. ................ 360/53
6,684,251 B1 * 1/2004 Qiu et al. ................... 709/228
6,684,287 B1 * 1/2004 Ng ............................... 711/4
6,721,251 B2 * 4/2004 Kojima et al. ........... 369/47.54
6,891,694 B2 * 5/2005 Hetzler et al. ........... 360/78.04

FOREIGN PATENT DOCUMENTS

JP 10302390 A * 11/1998

* cited by examiner

Primary Examiner—William Korzuch
Assistant Examiner—Daniell L. Negrón
(74) Attorney, Agent, or Firm—Westman, Champlin & Kelly P.A.

(57) ABSTRACT

A disc drive with a disc having multiple concentric data tracks. A track start point is rotationally displaced by a track skew time relative to a track start point of an adjacent concentric data tracks. The read/write head has a write settling time that is more than the track skew time. A data reordering circuit and firmware reorders write data and provides the reordered data to the read/write head after the write settling time. The reordering of the write data reduces write latency.

17 Claims, 8 Drawing Sheets

DISC DRIVE WITH REDUCED WRITE LATENCY

CROSS-REFERENCE TO RELATED APPLICATION

This application claims priority benefits from U.S. Provisional Application 60/375,858 titled "Zero Latency Writes," filed Apr. 26, 2002.

FIELD OF THE INVENTION

The present invention relates generally to disc drives. In particular, the present invention relates to disc drive that are adapted for use with audio and video recording/playback applications.

BACKGROUND OF THE INVENTION

Sequential read/write performances are becoming an important benchmark on disc drives used for audio and video applications. These performances are measured in terms of the rate of transfer between the host and drive in megabytes/second. In order to maximize the rate of transfer, the rotational latency of the drive needs to be minimized. After a read/write head has settled on a track and is adequately aligned with the track to read or write, there is an additional time, called latency, before the head actually begins to read or write data. Latency time is a time spent waiting for the disc to rotate such that the rotational sector that is to be read or written is aligned with the read/write head. Rotational latency is reduced by arranging the starting sector of the next head/track of the drive such that it is skewed. With a track skew adjusted to optimize read operation, the read/write head of the drive switches to the next head or seeks to the next track just in time to read the beginning of the next sequence of sectors on the new track. When not optimized, it is possible for the read/write head to miss the first sector of the next track and thus need to waste a disc revolution for the required sector to come round again to read. This caused the sequential read performance of the drive to fall. A similar problem occurs with write operations.

A method and apparatus are needed to improve the rate of transfer of data in disc drives and to reduce or eliminate latency in both sequential read and write operations of the disc drive.

SUMMARY OF THE INVENTION

Disclosed is a disc drive that includes a disc having multiple concentric data tracks. Each of the multiple concentric data tracks has a sequence of sectors starting at a track start point. The track start point of each track is rotationally displaced by a track skew time relative to a track start point of an adjacent concentric data track.

The disc drive includes a read/write head accessing the multiple concentric data tracks. The read/write head has a read settling time on moving between concentric data tracks that is less than the track skew time. The read/write head has a write settling time on moving between concentric data tracks that is more than the track skew time.

The disc drive includes a disc drive controller including a data reordering circuit. The data reordering circuit provides write data to the read/write head that is reordered. The data reordering circuit provides the reordered write data for a concentric data track after the write settling time. The reordering of the write data reduces write latency.

These and various other features as well as advantages that characterize the present invention will be apparent upon reading of the following detailed description and review of the associated drawings.

DETAILED DESCRIPTION OF ILLUSTRATIVE EMBODIMENTS

In the embodiments described below, a disc drive has reduced latency for both read and write operations and is improved for use with audio and video applications. For read operations, the skew between sequent tracks is set to a low value to reduce read latency. During write operations, data to be written is reordered so that a read/write head can begin writing reordered data immediately after a write settling time is completed. Writing does not need to start at the zero sector or track start point, but can start at any arbitrary sector on a track. The disc drive can continue to write to successive tracks without any write latency. Discs that are formatted in a standard manner to optimize read latency can be used with the reordered write process.

With the illustrated embodiments, problems with both read and write latency are avoided, and the performance of the disc drive in video and audio applications is improved.

Figure 1:
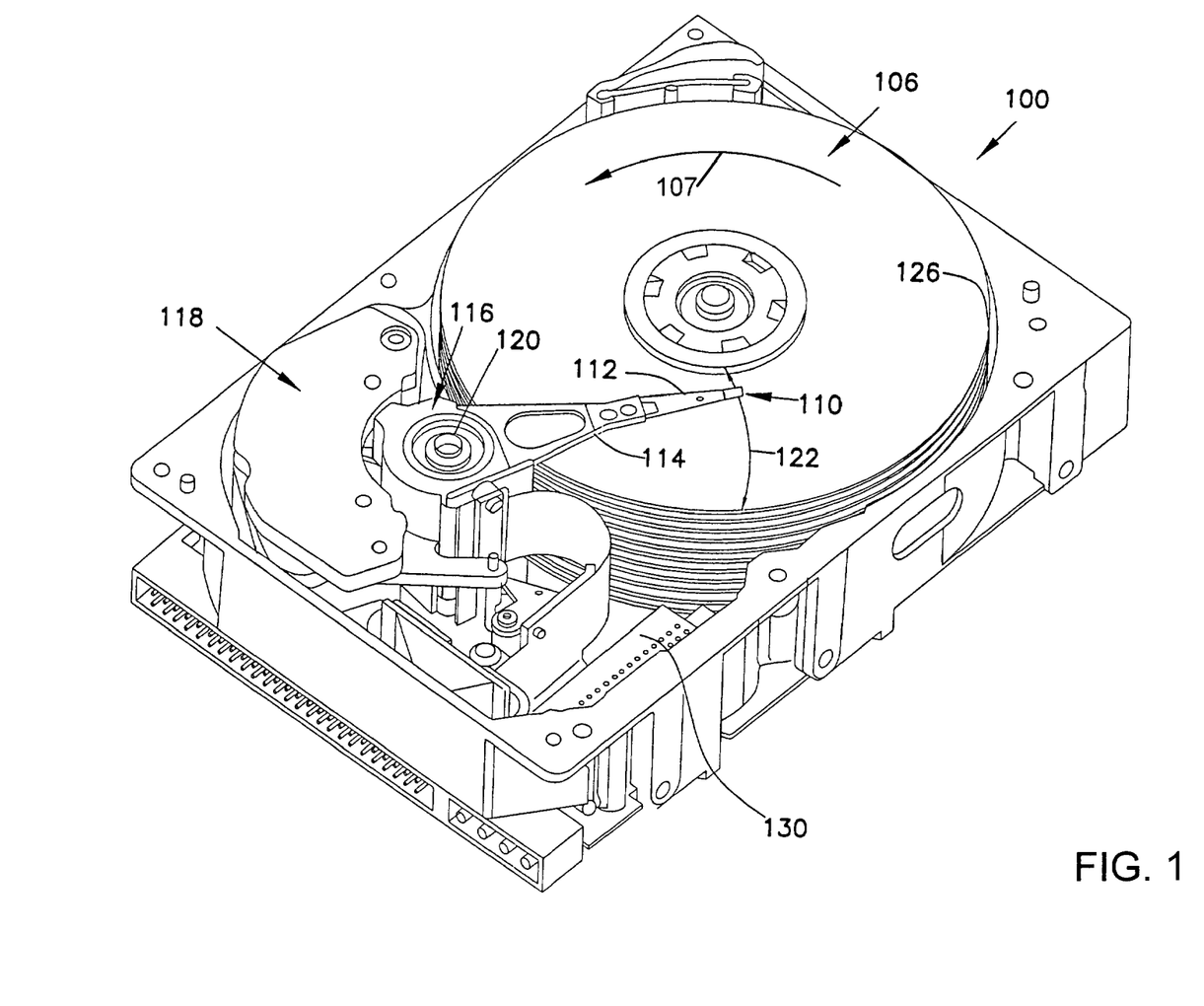
FIG. 1 illustrates a disc drive storage device.

FIG. 1 illustrates an embodiment of a disc drive storage device 100. Disc drive 100 includes a disc pack 126 having storage surfaces 106 that are illustratively layers of material (such as magnetic material or optically readable material). The disc pack 126 includes a stack of multiple discs each accessible by a read/write assembly 112 that includes a slider 110 that includes a read/write head. A spindle motor drives rotation of the discs in disc pack 126 in a direction such as that shown by arrow 107. As discs are rotated, read/write assembly 112 accesses different rotational locations on the storage surfaces 106 in disc pack 126. Read/write assembly 112 is actuated for radial movement relative to the disc surfaces 106, such as in a direction indicated by arrow 122, in order to access different tracks (or radial positions) on the disc surfaces 106. Such actuation of read/write assembly 112 is illustratively provided by a servo system that includes a voice coil motor (VCM) 118. Voice coil motor 118 includes a rotor 116 that pivots on axis 120.

VCM 118 also illustratively includes an arm 114 that supports the read/write head assembly 112.

Disc drive 100 illustratively includes a disc drive controller 130 for controlling operation of disc drive 100 and for transferring data in and out of the disc drive 100. As explained in more detail below, the disc drive controller 130 includes a data reordering circuit and firmware that reorders write data that is provided to the read/write head on slider 110. Using the reordered write data, the read/write head can begin write operations immediately after a write settling time. Write latency is reduced or eliminated.

Figure 2:
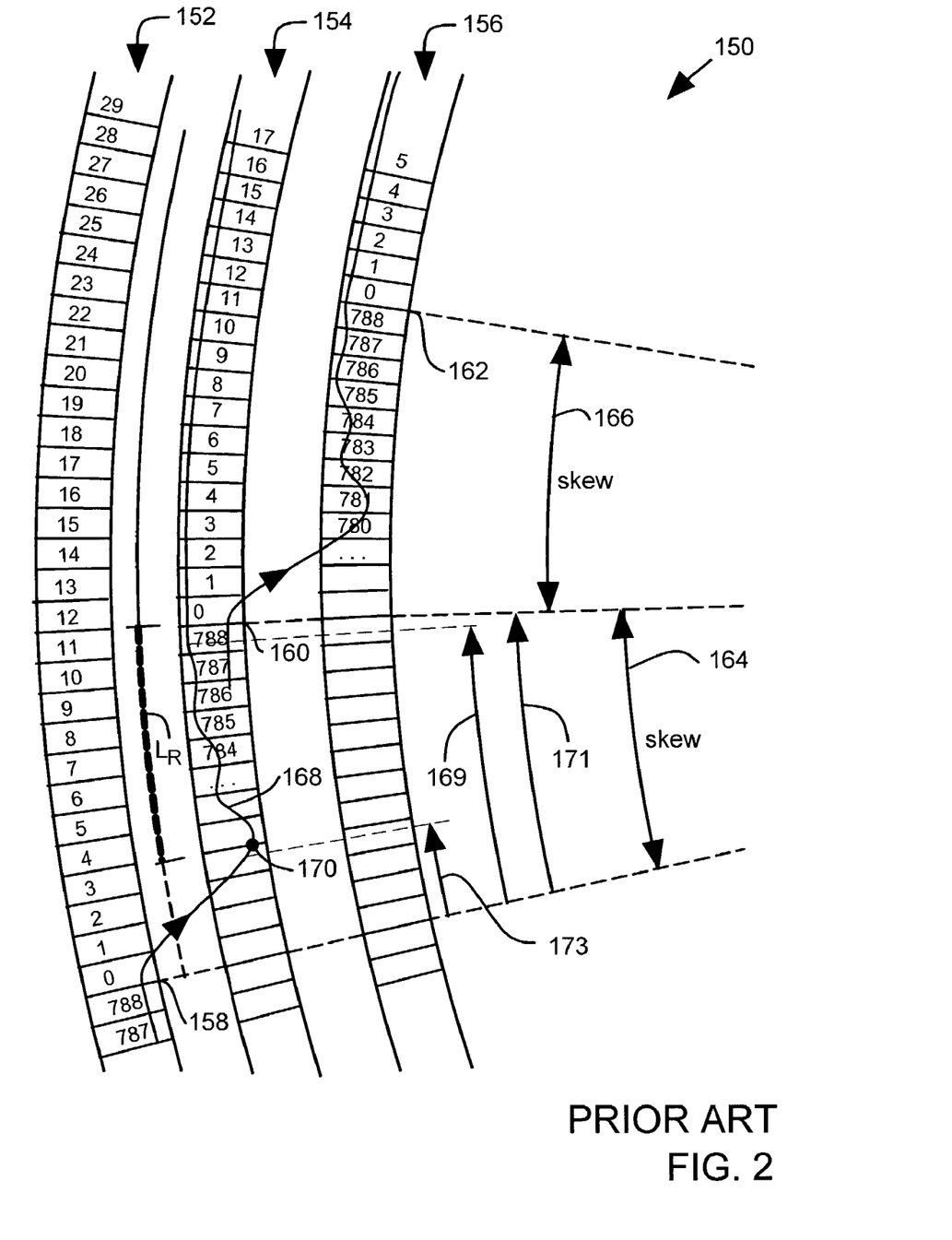
FIG. 2 schematically illustrates a PRIOR ART arrangement of portions of concentric round data tracks in which the start points are displaced by a track skew that is selected to reduce latency in write operations.

FIG. 2 schematically illustrates a portion of a disc 150 that includes portions of multiple consecutive, adjacent concentric round data tracks 152, 154, 156. The data tracks 152, 154, 156 have corresponding track start points 158, 160, 162 that are rotationally displaced relative to adjacent tracks by a track skew angle 164, 166. The skew angle 164 is a fixed, low level formatted feature of the disc 150. The skew angle can't be changed after the disc is assembled into a disc drive. Data can be read or written on track 154, for example, starting from a sector numbered "0" after a starting point 160 up to a sector numbered "788" just before the starting point 160.

Based on the angular rotational speed of the disc, each angular distance on the disc 150 corresponds with a time interval. The track skew angle 164, 166 corresponds with a track skew time that is the product of the skew angle in degrees multiplied by the rotational velocity of the disc is degrees/second. After a read/write head completes a WRITE operation on track 152, it moves along a path 168 to track 154 to continue with the WRITE operation on track 154. As can be seen in FIG. 2, the path 168 is settled within a WRITE settling time 169 that approximately equals the skew time 171. The head can begin a WRITE operation on track 154 immediately following the WRITE settling time, and there is essentially no WRITE latency. The skew angle 164 has been selected during the design of the disc drive to optimize write operations so that there is no WRITE latency. The start points 158, 160, 162 are displaced by a track skew 164, 166 that is selected to reduce latency in WRITE operations.

For READ operations on the disc 150, however, there is latency. Single track seek operations as well as head switching operations have different settling times depending on whether a READ or a WRITE operation is being performed. Longer write settling times are needed to ensure that the head is aligned well enough for a WRITE operation. The data of the tracks of a disc drive are skewed according to the WRITE settling time, which is longer than the READ settling time, to maximize sequential WRITE performance.

After a read/write head completes a READ operation on track 152, it moves along the path 168 to track 154 to continue with the READ operation on track 154. A read/write head has a READ settling time 173 that is much shorter time than the WRITE settling time 169. The read/write head is ready to begin reading at point 170 on path 168, however, the disc drive circuitry is arranged to start reading only at the start point 160. There is a thus a READ latency $L_R$ (indicated in a heavy dashed line in FIG. 2) from point 170 to start point 160. Disc 150 is formatted with relatively long skew angles 164, 166 to optimize WRITE performance, however, this is done at the expense of READ performance which is slowed by the latency $L_R$. As explained below in connection with FIG. 3, if the skew angles are alternatively made shorter to reduce or eliminate the READ latency illustrated in FIG. 2, then there is a much larger WRITE latency as shown in FIG. 3.

Figure 3:
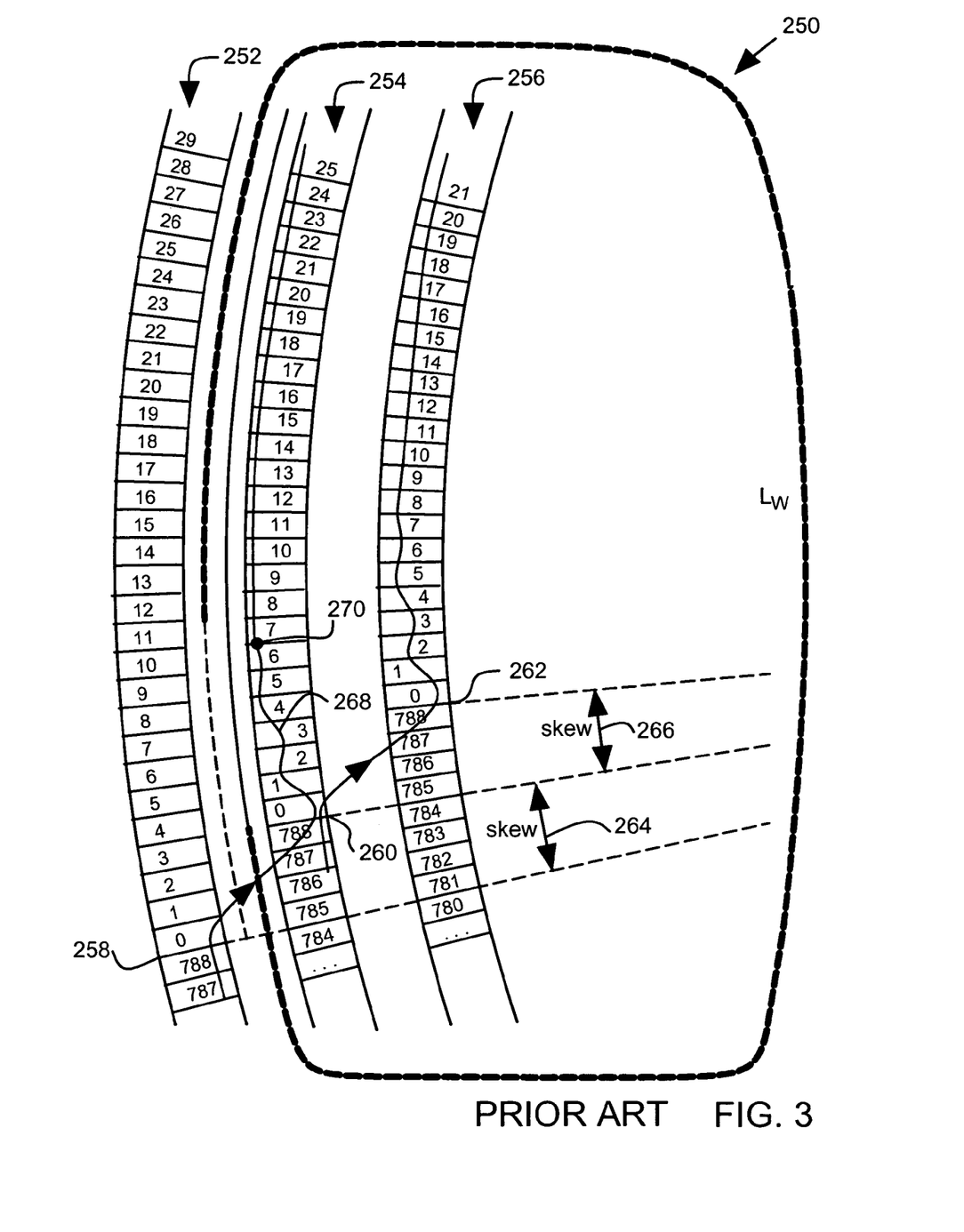
FIG. 3 schematically illustrates a PRIOR ART arrangement of portions of concentric round data tracks in which the start points are displaced by a track skew that is selected to reduce latency in read operations.

FIG. 3 schematically illustrates a portion of a disc 250 that includes portions of multiple consecutive, adjacent concentric round data tracks 252, 254, 256. The data tracks 252, 254, 256 have corresponding start points 258, 260, 262 that are rotationally displaced relative to adjacent tracks by a track skew angle 264, 266. The skew angle 264, for example, is a fixed, low level formatted feature of the disc 250. The skew angle can't be changed after the disc is assembled into a disc drive. Data can be written or read on track 254, for example, starting from a sector numbered "0" after a starting point 260 up to a sector numbered "788" just before the starting point 260.

Based on the angular rotational speed of the disc, each angular distance on the disc 250 corresponds with a time interval. Each track skew angle 264, 266 corresponds with a track skew time that is the product of the skew angle in degrees multiplied by the rotational velocity of the disc is degrees/second. After a read/write head completes a READ operation on track 252, it moves along a path 268 to track 254 to continue with the READ operation on track 254. As can be seen in FIG. 3, the path 268 is settled within a READ settling time that approximately equals the skew time. For the READ operation, the head can begin a READ OPERATION on track 254 immediately following the READ settling time, and there is no READ latency. The skew angle 264 has been selected during the design of the disc drive to optimize READ operations so that there is no READ latency. The start points 258, 260, 262 are displaced by a track skew 264, 266 that is selected to reduce latency in READ operations.

For WRITE operations on the disc 250, however, there is latency. Single track seek operations as well as head switching operations have different settling times depending on whether a WRITE or a READ operation is being performed. Longer WRITE settling times are needed to ensure that the head is aligned well enough for a WRITE operation. The data of the tracks of a disc drive are skewed according to the READ settling time, which is shorter than the WRITE settling time, to maximize sequential READ performance.

When a read/write head completes a WRITE operation on track 252, it moves along a path 268 to track 254 to continue with the WRITE operation on track 254. By the time the read/write head has settled enough for a WRITE operation at point 270, however, the start point 260 has already been passed. The disc 250 must complete almost an entire revolution before the read/write head reaches the start point 260. A read/write head settles to READ in a much shorter time than it settled to WRITE. The read/write head is settled enough to begin a write operation at point 270 on path 268, however, the disc drive circuitry is arranged to start a write operation only at the start point 260. There is a thus a WRITE latency $L_W$ (indicated in a heavy dashed line in FIG. 3) from point 270 around almost a complete revolution to start point 260. Disc 250 is formatted with relatively short skew angles 264, 266 to optimize READ performance, however, this is done at the expense of WRITE performance which is slowed by the latency as illustrated. The drive wastes almost 1 rotational latency for every sequentially written track on the disc drive as shown in FIG. 3.

Figure 4:
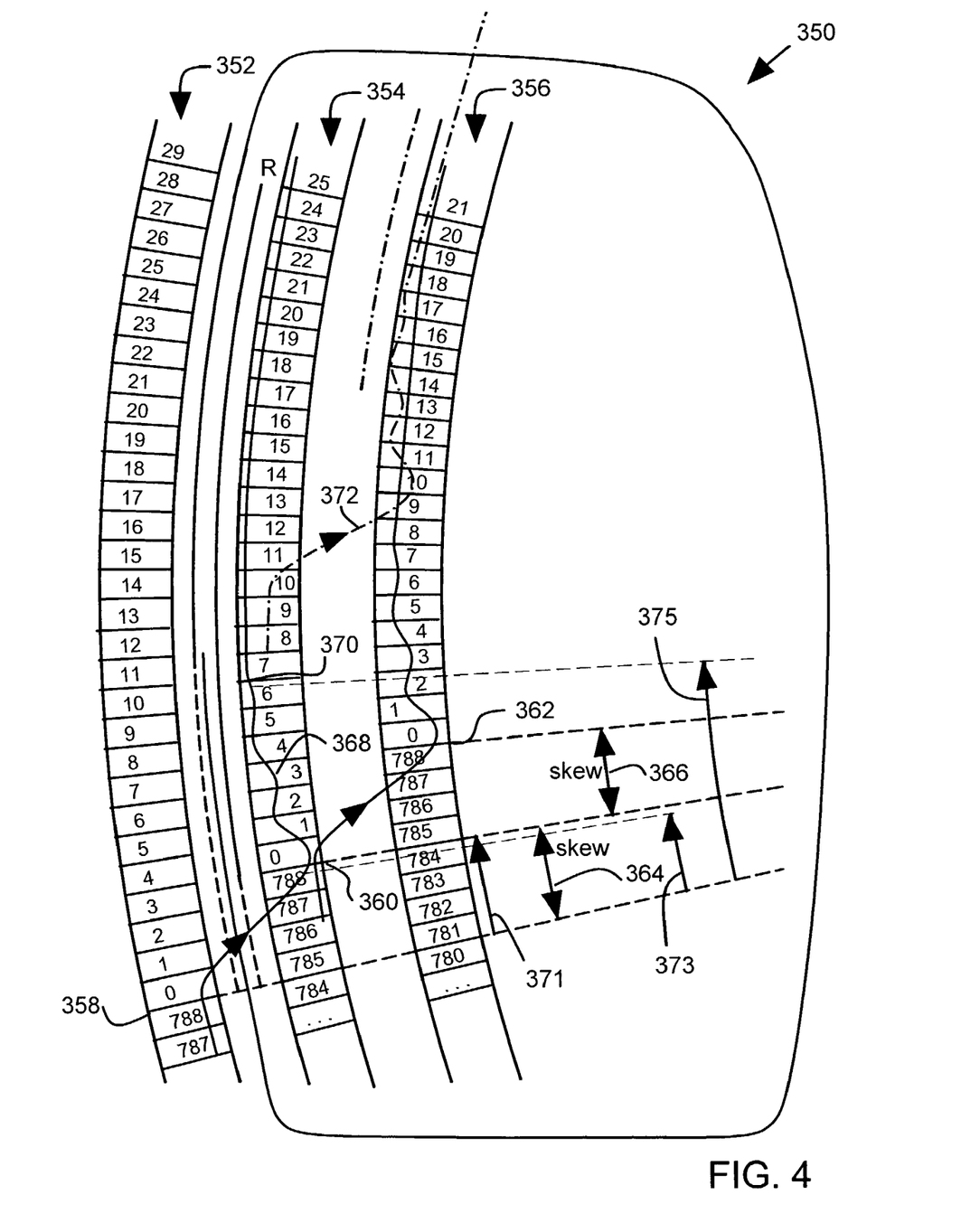
FIG. 4 schematically illustrates portions of concentric round data tracks in which the start points are displaced by a track skew for read operations, and in which data is reordered to reduce latency during write operations.

FIG. 4 illustrates an embodiment in which there is substantially no read latency $L_R$ (illustrated in FIG. 2) and also substantially no write latency $L_W$ (illustrated in FIG. 3) while sequentially accessing tracks in a disc drive. The arrangement illustrated in FIG. 4 avoids the long write latency $L_W$ even though the starting points of the tracks are skewed for optimized READ operation performance. In FIG. 4, data to be written on the disc is reordered in a sequence that is different than a consecutive numerical order sequence starting at zero (0) so that the read/write head can start writing data as soon as the read/write head completes its seek operation and is settled long enough to write. The writing can start at an arbitrary point on a track and there is no need to start writing data at sector zero (0) after the starting point of a track. The data is reordered by a firmware reordering circuit in a disc drive controller. A disc that is formatted to optimize read operations, such as disc 250 shown in FIG. 3, can be used without modification, if desired.

FIG. 4 schematically illustrates a portion of a disc 350 that includes portions of multiple consecutive, adjacent concentric round data tracks 352, 354, 356. The data tracks 352, 354, 356 have corresponding start points 358, 360, 362 that are rotationally displaced relative to adjacent tracks by a track skew angle 364, 366. The skew angle 364, for example, is a fixed, low level formatted feature of the disc 350. The skew angle can't be changed after the disc is assembled into a disc drive. Data can be written on track 354, for example, starting at an arbitrary sector number between a sector numbered "0" to a sector numbered "788." Writing does not have to start at the starting point 360.

Based on the angular rotational speed of the disc, each angular distance on the disc 350 corresponds with a time interval. Each track skew angle 364, 366 corresponds with a track skew time that is the product of the skew angle in degrees multiplied by the rotational velocity of the disc is degrees/second. After a read/write head completes a READ operation on track 352, it moves along a path 368 to track 354 to continue with the READ operation on track 354. As can be seen in FIG. 4, the path 368 is settled within a READ settling time 373 that approximately equals the skew time 371. For the READ operation, the head can begin a READ operation on track 354 immediately following the READ settling time, and there is no READ latency. The skew angle 364 has been selected during the design of the disc drive to optimize READ operations so that there is no READ latency. The start points are displaced by a track skew 364, 366 that is selected to reduce latency in READ operations.

For WRITE operations on the disc 350, there is also no latency. Single track seek operations as well as head switching operations have different settling times depending on whether a WRITE or a READ operation is being performed. Longer WRITE settling times are needed to ensure that the head is aligned well enough for a WRITE operation. The data of the tracks of a disc drive are skewed according to the READ settling time, which is shorter than the WRITE settling time, to maximize sequential READ performance. After a read/write head completes a WRITE operation on track 352, it moves along a path 368 to track 354 to continue with the WRITE operation on track 354. By the time the read/write head has settled at point 370, however, the start point 360 has already been passed. Firmware in the disc drive has reordered the data to be written in a new order that starts with data to be written at the next available sector, which in this example is sector number 7 on track 354. The read/write head begins writing at sector number 7 and there is no write latency.

The disc 350 is included in a disc drive such as disc drive 100 illustrated in FIG. 1. Each disc 350 has multiple concentric data tracks such as tracks 352, 354, 356. Each of the multiple concentric data tracks, such as track 354, has a track start point 360 that is rotationally displaced by a track skew 364, 366 relative to track start point 358, 362 of adjacent concentric data tracks 352, 356.

A read/write head in a slider, such as slider 110 in FIG. 1, accesses the multiple concentric data tracks 352, 354, 356. The read/write head has a read settling time 373 on moving between concentric data tracks 352, 354, 356 that is less than the track skew time 371. The read/write head has a write settling time 375 on moving between concentric data tracks that is more than the track skew time 364.

A data reordering circuit implemented in firmware in the disc drive controller provides write data to the read/write head. The data reordering circuit providing the write data for a concentric data track after the write settling time. The write data is reordered such that there is no write latency. The operation of the firmware that reorders data to be written in a new order is explained in more detail below in connection with FIGS. 5-7.

In FIG. 4, sequential writes on 3 tracks with 789 sectors each are illustrated. Instead of writing from sectors 0 to 788, the zero latency write algorithm, in the case of the track 354, writes sector 7, 8, 9 . . . 788, 0, 1, 2, 3, 4, 5, 6. In sequential writes, it proceeds to the track 356 along line 372 to start the write at sector 14, 15, 16 . . . 788,0,1 . . . 12, 13. Starting the write operation as soon as the read/write head is settled enough to write avoids the long rotational latency due to slow write seek settling times illustrated in FIG. 3.

However, optimizing the skewing of data on tracks for sequential reads has some disadvantages. For short sequential writes that do not cover the span of the next entire track, the disc drive 100 will need two revolutions to complete a write operation. The availability of write queue caching, however, minimize this time lost due to short sequential writes.

In cases where tests show that short sequential writes causes a high impact on the final benchmark scores for the disc drive speed, the drive's skew may still be reverted back to write settling times. This can be done because the data is reordered in firmware and write operations can start at any arbitrary sector on the disc. Even in such cases, zero latency writes opens up an opportunity for the disc drive to start writing at any position on the track as soon as write settling is accomplished and there is sufficient data to write.

To implement the arrangement shown in FIG. 4, disc sequencer firmware and hardware can be arranged with the following features:

Feature 1. Starting write operations on any sector on a disc track based on reducing latency.

Feature 2. Generating an error correction code (ECC) seed based on the actual physical sector number on the track.

Feature 3. Writing data through the last sector of the track back to logical sector number 0 without stopping the disc sequencer.

Feature 4. Remapping or reordering of the sequence of data written. On track 354 of FIG. 4, for example, reordering data arranged for logical sectors 0 to 788 to a reordered sequence from logical sector 7 to 6.

Feature 5. Writing data in a buffer in any arbitrary order determined by a table of linked lists.

Features 1 and 3 above can be implemented in the disc drive controller. Feature 2 ran be achieved by tying the ECC seed used for every sector on a track to the PHYSCTR register. This can be achieved by programming bit 13 (Phy-Sect-Select) of register OxEE20 to 1. In other ECC seed operation modes, on track 354 of FIG. 4 for example, the ECC seed after sector 788 would increase to 789, 790, 791 and so on, instead of resetting to 0. If the ECC seed for every sector was not tied to PHYSCTR, then this could cause the ECC seed for sectors 0 to 6 to be incorrectly written, and sectors 0 to 6 could not be read back later. Tying the ECC seed with PHYSCTR ensures sectors written in any order can be read back later.

Features 4 and 5 above can be implemented in a virtual buffer manager (VBM) feature of the disc controller. The data of all sectors that are to be written to the disc are pointed by the Disc Access Pointer (DAP). In VBM operational modes, the DAP changes its values based on a single-linked-list, after each sector is written to the disc.

Figure 5:
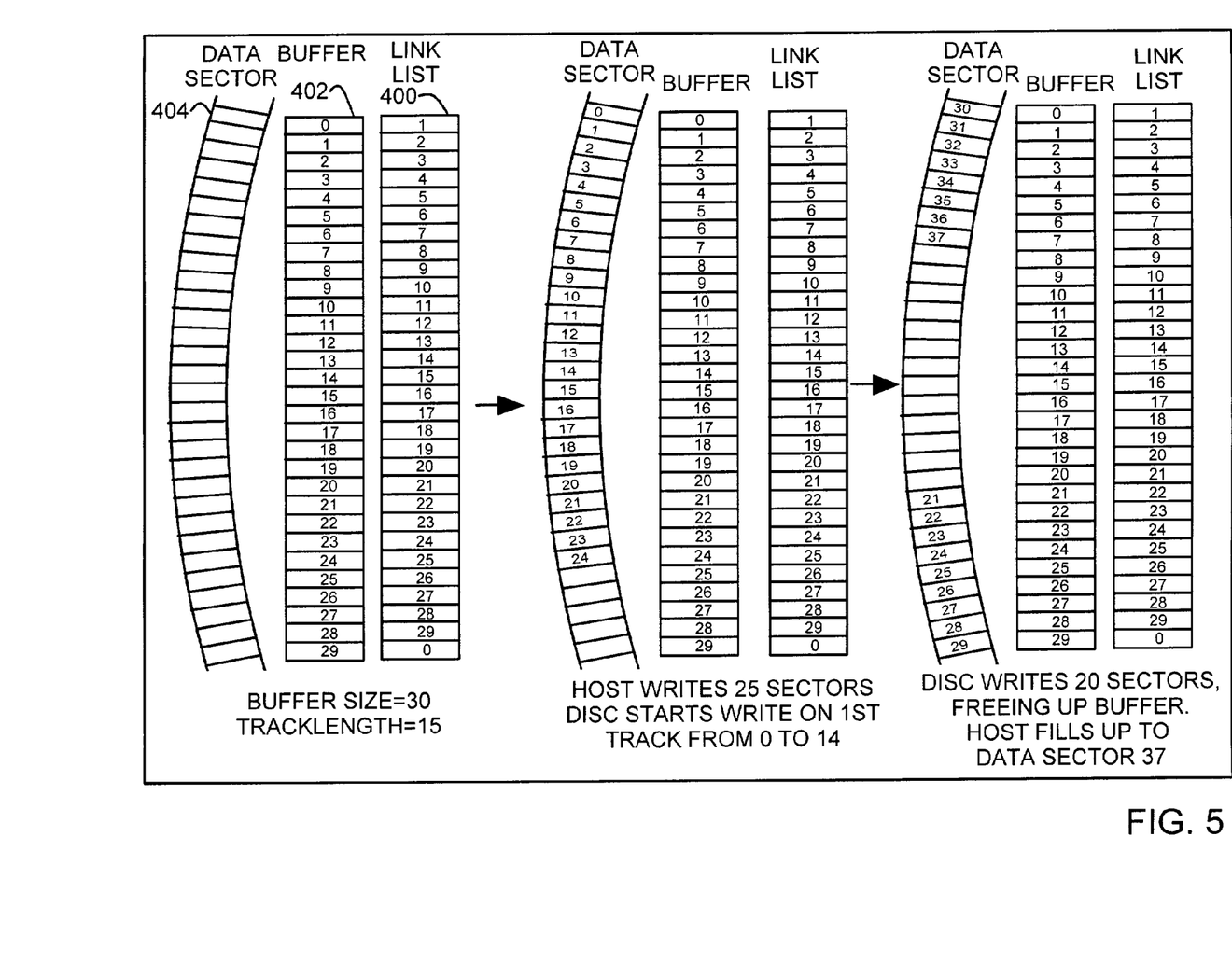
FIG. 5 schematically illustrates VBM in a normal operation mode.

FIG. 5 schematically illustrates a virtual buffer manager (VBM) in a normal operation mode. In FIG. 5, the VBM is initially setup using a circular single-linked-list 400. Under normal operations, data received from the host (computer system) during an interface write command are filled up in the buffer 402 while writes by the disc sequencer to the media (data sectors 404) frees up the buffer 402. When the buffer 402 is full, a busy status is posted on the interface to prevent the host from writing additional data to the buffer 402. Similarly, when the disc sequencer empties the buffer 402 faster than the host can fill the buffer with data, the disc sequencer is paused to wait for one disc revolution so that the data will eventually be available in the buffer 404.

In FIG. 5, a drive with a track length of only 15 sectors and a write buffer size of 30 sectors is illustrated. In normal write sequential operation, data sectors 0 to 14 will be written to a first track 1, data sectors 15 to 29 will be written to a second track 2 and finally sectors 30 to 37 to third track 3.

Figure 6:
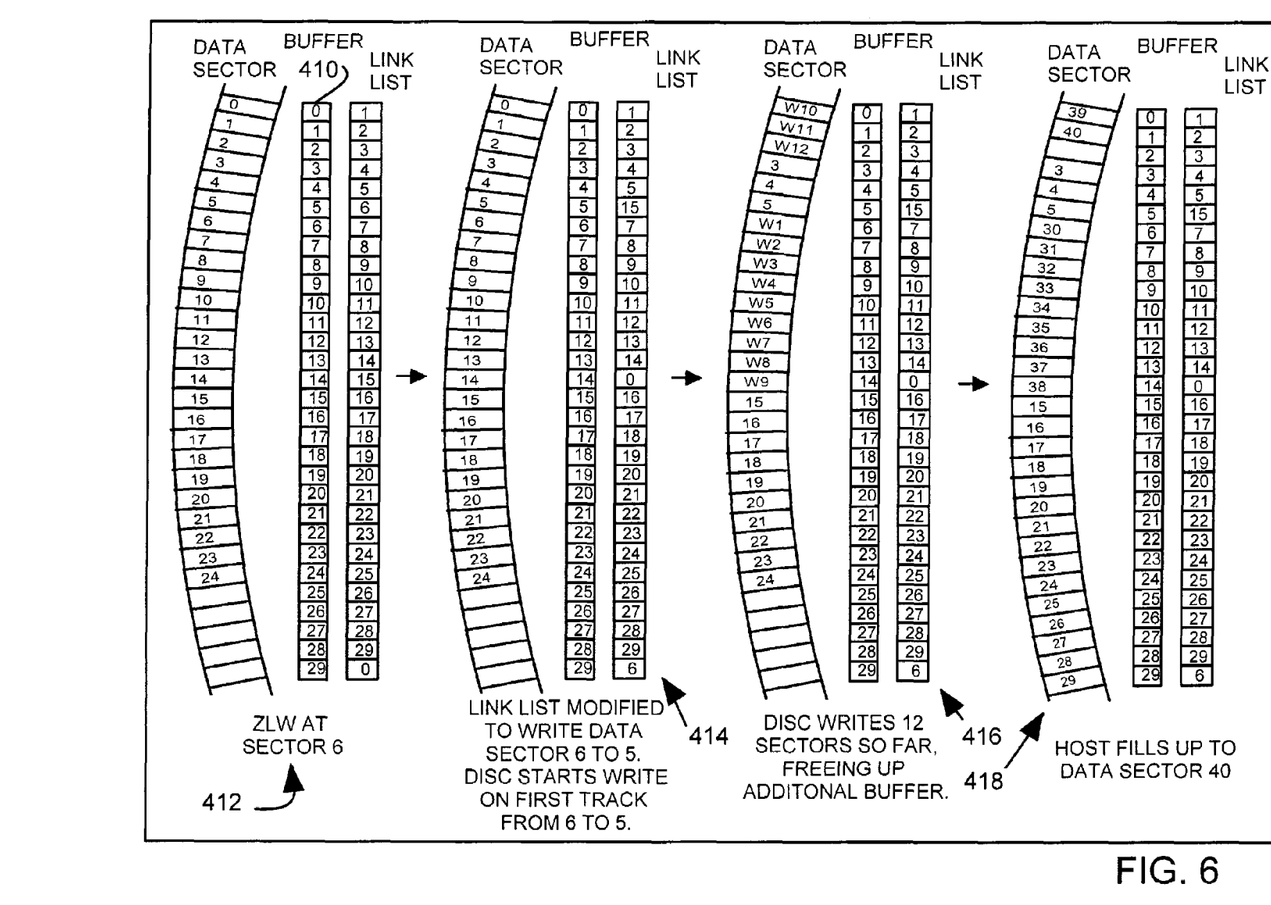
FIG. 6 schematically illustrates VBM under ZLW operation mode on an initial track.

FIG. 6 schematically illustrates the virtual buffer manager (VBM) under ZLW operation mode on a first track. FIG. 6 illustrates the use of VBM to reorder the sequence of sectors written to the disc media. Data is first written into the buffer 410 and the leftmost diagram 412 shows 25 sectors already written to the buffer 410. When the actuator seeks to the target track, it finds itself only able to start the write on sector 6 instead of sector 0. To do ZLW, the read/write code performs the following steps:

Step 1. Determine if there is enough data in the disc buffer 410 to write 1 complete track. If there is not enough data, ZLW is aborted.

Step 2. Check if sector 6 is part of a defect, if it is, choose the next nearest good sector.

Step 3. Modify the single linked-list 414, illustrated in the second diagram in FIG. 6.

Step 4. Change the DAP to point at the data at sector 6.

Step 5. Modify the disc sequencer to start write on sector 6 and stop at sector 5.

The third diagram 416 in FIG. 6 shows the write buffer space being freed as data is written to the disc media. The fourth diagram 418 shows that the freed buffer is available immediately to the host to fill more data. This concurrent filling and emptying of data in the buffer improves the throughout especially in write sequential operations.

Figure 7:
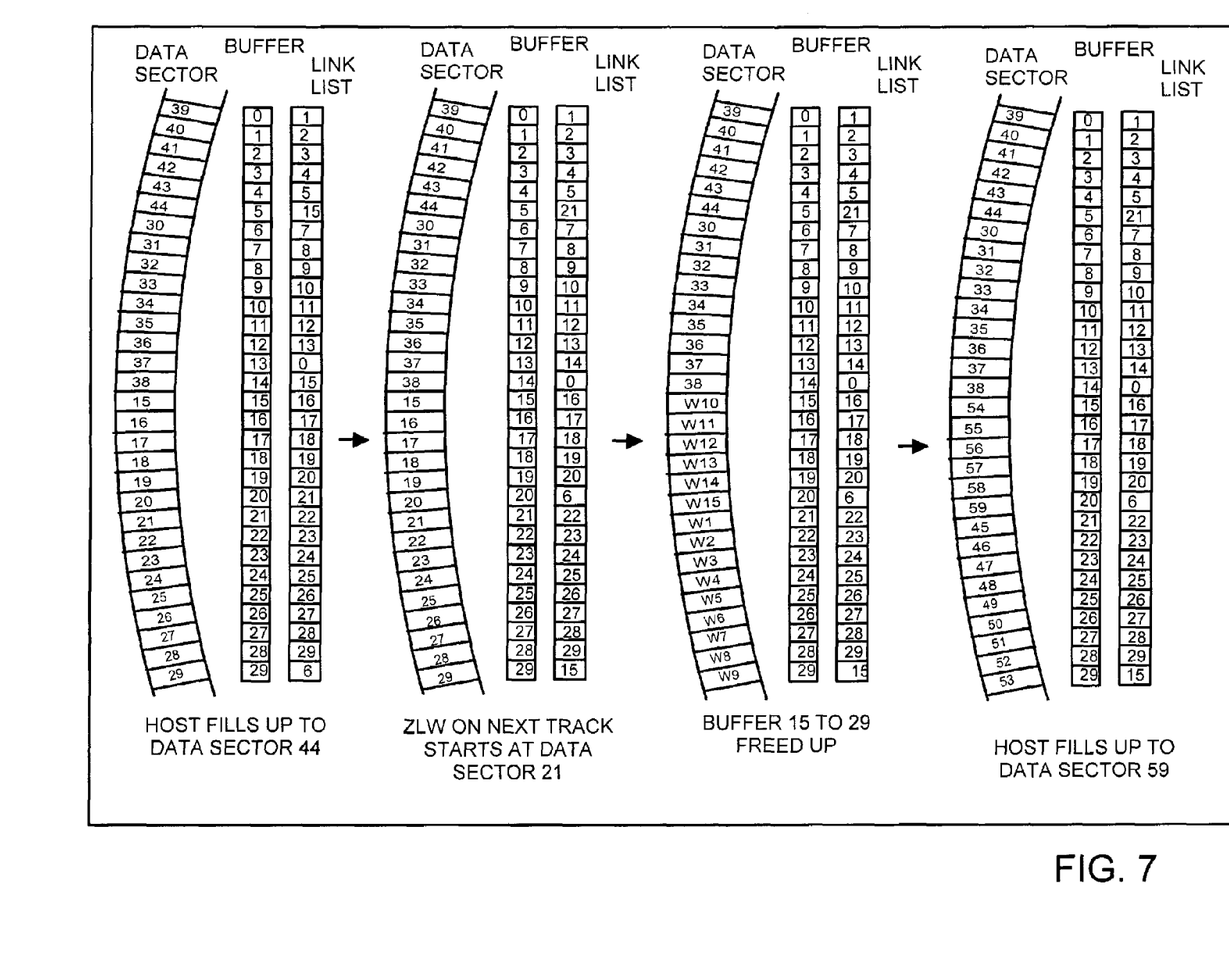
FIG. 7 schematically illustrates VBM under ZLW operation mode on subsequent tracks.

FIG. 7 schematically illustrates VBM under ZLW operation mode on subsequent tracks. FIG. 7 illustrates that VBM is used to reorganize the sequence of data that is written to the disc and received from the host for subsequent sequential tracks.

Figure 8:
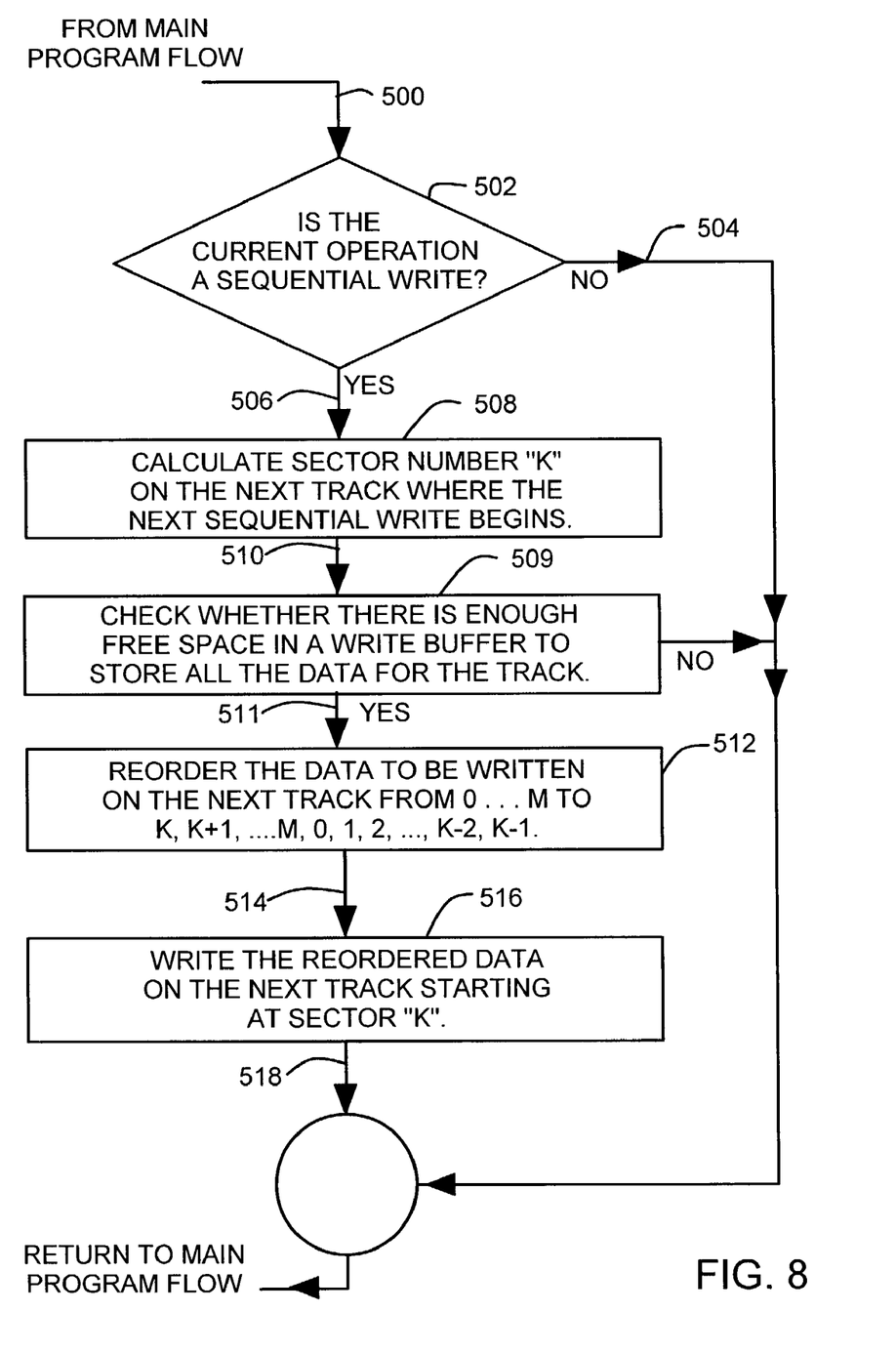
FIG. 8 schematically illustrates a process of sequential writing of reordered data.

FIG. 8 schematically illustrates a process of sequential writing of reordered data. The process illustrated in FIG. 8 is part of a main program flow in the controller. The main program flow at 500 moves to a decision block 502 that tests whether the current operation is a sequential write operation. If the current operation is not a sequential write operation, then program flow progress along line 504 to return to the main program flow. If the current operation is a sequential write operation, then program flow moves along line 506 to calculation 508. Calculation 508 calculates the sector number "K" of the next track where the next sequential write begins. This calculation takes into account the settling time needed for a write operation after the start of a seek operation. It also takes into account the last sector number written on the last track and the amount of skew between the tracks.

After calculation 508 is complete, program flow moves along line 510 to checking process 509. Checking process 509 checks whether there is enough free space in a write buffer to store all of the data for the the track that is to be written. If there is not enough space, then the reordering process is not completed for the track, and process flow returns to the main program flow. If there is enough free space, then proces flow continues along line 511 to a reordering process 512. Reordering process 512 reorders the data to be written on the next track from sectors 0 . . . M to sectors K, K+1, . . . M, 0, 1, 2, . . . , K−2, K−1.

After reordering process 512 is complete, program flow moves along line 514 to write process 516. Write process 516 writes the reordered data on the next track starting at sector K and finishing at sector K−1.

After write process 516 is complete, program flow moves along line 518 to return to the main program flow.

The method enables the opportunity to reduce the cylinder and head skews, optimized for sequential read performances, without incurring a high penalty to sequential write performances.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope of the present invention. For example, the disc drive may include a single disc or multiple discs, discs with magnetic media on one or both disc sides. In addition, although the preferred embodiment described herein is directed to a layered read/write head, it will be appreciated by those skilled in the art that the read and write heads can be separate components. The teachings of the present invention can be applied to other magnetic systems, like tape drives, without departing from the scope of the present invention.

What is claimed is:

1. A process of performing a sequential write operation in an apparatus, comprising:
    calculating a sector number "K" of a next track where a next sequential write operation begins;
    reordering data to be written on the next track from an order of sectors 0 . . . M in numerical sequence to a reordered data sequence of sectors K, (K+1), . . . M, 0, 1, 2, . . . , (K−2), (K−1), the reordering reducing write latency angle waiting for alignment with a sector during the write operation;
    writing the reordered data on the next track starting at sector K and finishing at sector (K−1); and
    generating error correction codes for the reordered write data based on physical sector numbers of the sectors during the write operation.

2. The process of claim 1 wherein the calculating takes into account a settling angle needed for a write operation after the start of a seek operation.

3. The process of claim 1 wherein the calculating also takes into account the last sector number written on the last track and the amount of skew between the tracks.

4. The process of claim 1 comprising starting the writing after a write settling angle.

5. The process of claim 1 further comprising setting an errors correction code seed for each sector according to a physical sector register.

6. The process of claim 1 further comprising writing data through the track start point without stopping sequencing.

7. The process of claim 1 further comprising writing write data in a write buffer in an order controlled by a table of linked lists.

8. The process of claim 1 further comprising writing the write data in a write buffer.

9. The process of claim 1 further comprising pointing to data that is to be written into sectors with a access pointer.

10. An apparatus, comprising,
   sectors; and
   a controller circuit reordering write data, the reordering reducing write latency angle waiting for alignment with a sector; the controller circuit generating error correction codes for the reordered write data based on physical sector numbers of the sectors during a write operation wherein the write data is reordered from a sequence arranged 0 . . . N corresponding with 0 . . . N sectors starting with sector 0 at the track start point to a reordered sequence K . . . N, 0 . . . (K−1) where sector K is a first physical sector written after the write settling angle.

11. The apparatus of claim 10 wherein write operations of the reordered data including error correction codes based on physical sector number at a next sector are started after a write settling angle.

12. The apparatus of claim 10 wherein an error correction code seed for each sector is set according to a physical sector register.

13. The apparatus of claim 10 wherein data is written as the read/write head passes through a track start point without stopping sequencing.

14. The apparatus of claim 10 wherein write data is written in a write buffer in an order controlled by a table of linked lists.

15. An apparatus, comprising:
   sectors; and
   means for providing reordered write data, the reordering reducing write latency angle waiting for alignment with a sector during a write operation, and for generating error correction codes for the reordered write data based on physical sector numbers of the sectors during a write operation wherein the means for providing reordered write data reorders the data from a sequence arranged 0 . . . N corresponding with 0 . . . N sectors starting with sector 0 at the track start point to a reordered sequence K . . . N, 0 . . . (K−1) where sector K is a first sector written by the read/write head after the write settling angle.

16. The apparatus of claim 15 wherein the means for providing reordered write data starts write operations of the reordered data including error correction codes based on physical sector number at a next sector accessed after a write settling angle.

17. The apparatus claim 15 wherein the means for providing reordered write data sets an error correction code seed for each sector according to a physical sector register.

* * * * *

UNITED STATES PATENT AND TRADEMARK OFFICE
CERTIFICATE OF CORRECTION

PATENT NO. : 7,253,981 B2 Page 1 of 1
APPLICATION NO. : 10/252742
DATED : August 7, 2007
INVENTOR(S) : Wei Loon Ng et al.

It is certified that error appears in the above-identified patent and that said Letters Patent is hereby corrected as shown below:

Col. 10, line 29, insert "of" as shown below:

"The apparatus of claim 15..."

Signed and Sealed this

Thirtieth Day of October, 2007

JON W. DUDAS
*Director of the United States Patent and Trademark Office*